(12) United States Patent
Barbone

(10) Patent No.: US 12,366,555 B2
(45) Date of Patent: Jul. 22, 2025

(54) WELDING ASSESSMENT DURING WELDING PROCESS

(71) Applicant: Georg Fischer Rohrleitungssysteme AG, Schaffhausen (CH)

(72) Inventor: Riccardo Barbone, Schaffhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 191 days.

(21) Appl. No.: 18/074,638

(22) Filed: Dec. 5, 2022

(65) Prior Publication Data

US 2023/0176014 A1 Jun. 8, 2023

(30) Foreign Application Priority Data

Dec. 7, 2021 (EP) .................. 21 212 668.4

(51) Int. Cl.
*G01N 29/04* (2006.01)
*G01N 29/24* (2006.01)

(52) U.S. Cl.
CPC ......... *G01N 29/04* (2013.01); *G01N 29/2418* (2013.01); *G01N 2291/0235* (2013.01); *G01N 2291/0289* (2013.01); *G01N 2291/2675* (2013.01)

(58) Field of Classification Search
CPC ............ G01N 29/04; G01N 29/2418; G01N 2291/0289; G01N 2291/2675; G01N 2291/0235; G01N 21/952; G01N 29/043; G01N 29/22; G01N 29/225; G01N 2291/2634; G01N 2291/267; B29C 66/974; B29C 65/2092; B29C 65/8253; B29C 65/8292; B29C 66/0224; B29C 66/1142; B29C 66/522; B29C 66/5221; B29C 66/5344; B29C 66/73921; B29C 66/91411; B29C 66/9241; B29C 66/944; B29C 66/95; B29C 66/96; B29C 65/20; B29C 65/82; B29C 66/87; B29C 65/7841; B29L 2023/00; B29D 23/001
USPC .......................................................... 73/588
See application file for complete search history.

(56) References Cited

U.S. PATENT DOCUMENTS

| | | | | |
|---|---|---|---|---|
| 2004/0244509 A1* | 12/2004 | Savitski | .................. | B29C 65/82 374/45 |
| 2013/0036820 A1* | 2/2013 | Michaut | ............... | G01N 29/041 73/601 |
| 2021/0132003 A1* | 5/2021 | Wermelinger | ...... | B29C 66/5229 |

(Continued)

FOREIGN PATENT DOCUMENTS

| DE | 3720523 A1 * | 1/1988 |
|---|---|---|
| DE | 102010048612 A1 | 4/2012 |
| EP | 2963380 A1 | 1/2016 |

(Continued)

OTHER PUBLICATIONS

Machine translation of DE-3720523-A1 (Year: 1988).*
Machine Translation of JP 3541166 B2 (Year: 2004).*
Machine translation of KR 20130023343 A (Year: 2013).*

*Primary Examiner* — Timothy P Graves
(74) *Attorney, Agent, or Firm* — Harness, Dickey & Pierce, P.L.C.

(57) ABSTRACT

A method and a system including a welding device, an inspection device having an inspection head having two sensors, a controller, and a memory for assessing a butt weld of plastic pipes or fittings in a welding device.

13 Claims, 2 Drawing Sheets

(56) References Cited

U.S. PATENT DOCUMENTS

Figure 1:
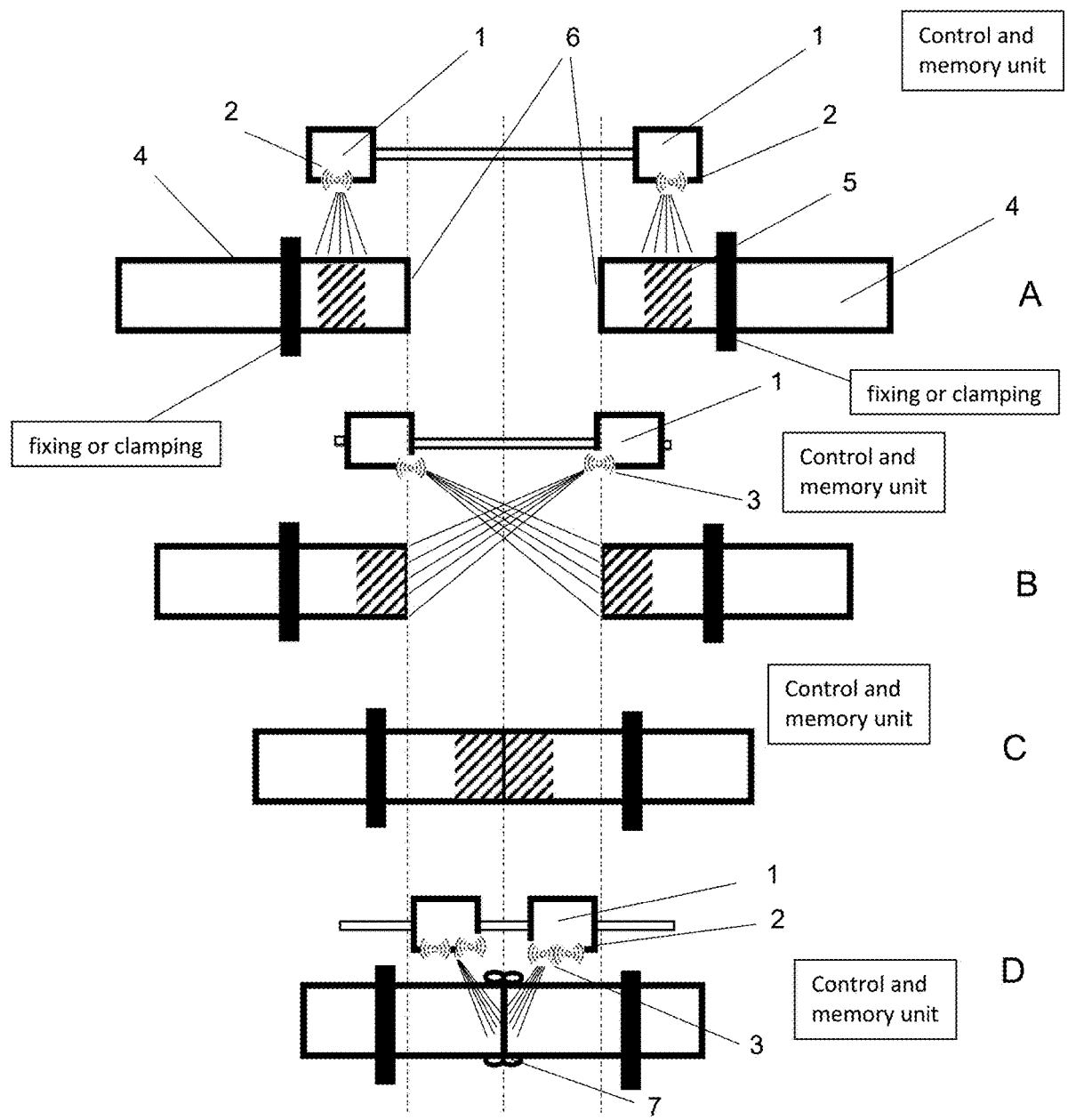

2023/0024687 A1\* 1/2023 Saito .................... B23K 11/255

FOREIGN PATENT DOCUMENTS

| EP | 3550256 | A1 |   | 10/2019 |
|----|---------|----|---|---------|
| EP | 3816621 | A1 |   | 5/2021  |
| JP | 3541166 | B2 | \* | 7/2004  |
| KR | 20130023343 | A | \* | 3/2013 |

\* cited by examiner

WELDING ASSESSMENT DURING WELDING PROCESS

CROSS REFERENCE TO RELATED APPLICATION

This application claims the benefit and priority of European Patent Application No. 21 212 668.4 filed Dec. 7, 2021. The entire disclosure of the above application is incorporated herein by reference.

BACKGROUND OF THE INVENTION

Technical Field

The invention relates to a method and a system including a welding device, an inspection device having an inspection head having two sensors, a controller, and a memory for assessing a butt weld of plastic pipes or fittings in a welding device having the following steps:
  clamping or fixing the pipe ends to be welded with opposing end faces in a welding device,
  autonomously aligning or adjusting an inspection head on the basis of the pipe parameters for subsequently acquiring the pipe ends,
  inspecting a predetermined region at the two pipe ends by means of at least one first sensor arranged in the inspection head,
  evaluating the ascertained inspection data on the basis of predetermined values,
  inspecting the end faces of the pipe ends by means of a second sensor, wherein the second sensor uses a different inspection method than the first sensor,
  evaluating the ascertained inspection data on the basis of predetermined values,
  carrying out the welding process including recording the welding process

DISCUSSION

A check of a butt weld is used for the quality control of the weld. Which method was used to butt weld the pipes or fittings does not play a role, whether by means of a contactless IR welding method, by means of the classic butt welding method by touching the heating reflector, or another method. A weld seam has to have a certain shape and size, which can be optically inspected and on the basis of which a weld has been inspected up to this point, in accordance with the pipes or fittings to be welded, i.e., their dimensions, their plastic, the welding technology which is applied, etc. Guidelines or norms correspondingly exist for this purpose, which define precisely how a seam has to appear and how the permissible dimensions have to be with respect to the properties of the pipe or fitting and weld, so that it corresponds to the requirements.

Moreover, it is known that such a weld seam is also checked by means of ultrasound for the check, to examine the microstructure of the weld seam. However, this only takes place after the weld seam is completely cooled and requires the welded ends to remain clamped for a certain time on the welding device until an ultrasonic inspection of the seam can be carried out.

Up to this point, a manual visual assessment and an ultrasonic inspection have usually been carried out by a competent technician, who compares and inspects the resulting weld seam on the basis of the norms and guidelines known to them and then assesses it.

It is disadvantageous here that assessments by a technician are also very time-consuming due to the cooling time of the weld seam and are thus very expensive.

Inspection methods of a weld seam are known from EP 3 550 256 A1 and EP 2 963 380 A1, which only inspect the weld seam optically for its shape by way of a sensor, however.

A device and a method for an ultrasonic inspection for a butt weld seam on a plastic pipe are known from EP 3 816 621 A1. The disadvantage here is also that the seam first has to be completely cooled before such an inspection can be carried out, which is very time-consuming and therefore such inspections by the corresponding technicians are very expensive.

Moreover, a special device is to be used for each inspection, which also requires a long time for its installation and a large amount of equipment, which always has to be carried along to the locations or construction sites where such welds are carried out.

It is the aspect of the invention to propose a method and a system for assessing a butt weld, which saves time and personnel, due to which welds or their inspections can be carried out less expensively and moreover the evaluations or assessments are reliable.

SUMMARY

This aspect is achieved according to the preferred embodiment of the invention in that the final evaluation of the weld is carried out on the basis of the ascertained inspection data and the recorded welding process and that the inspection head contains two sensors, wherein the sensors have different inspection methods.

The method according to the preferred embodiment of the invention for assessing a butt weld of plastic pipes and fittings in a welding device includes the following steps:
The pipe ends or fitting ends to be welded are clamped or fixed in a welding device, wherein the end faces of the pipe ends or fitting ends are arranged mutually opposing. An inspection head thereupon autonomously aligns or adjusts itself on the basis of the pipe parameters to be able to subsequently acquire the pipe ends for an inspection. An inspection of a predetermined region, at each of the two pipe ends, then takes place by means of the inspection head or by means of at least one first sensor arranged in the inspection head. The ascertained inspection data are then evaluated and assessed on the basis of predetermined values. Wherein the evaluation of the ascertained inspection data preferably takes place on the basis of an algorithm, on the basis of the calculation and assessment of which the predetermined region is defined as good or inadequate for a weld. If the region is defined as inadequate, this pipe end piece can be cut off, for example, and an inspection can then be carried out with a new region. Upon an assessment as good, the method can be continued. Wherein the predetermined values for the assessment are preferably stored in a controller or in a memory of the controller, as is the algorithm used. The predetermined values are then used as comparison values to the inspection data calculated by means of the algorithm, or to then carry out the assessment as good or inadequate. It is advantageous if the values are compared to new experiential values again and again, adapted, and supplemented, wherein the controller can execute this autonomously or data can also be incorporated manually. Moreover, it is advantageous if the values or other data for the method according to the preferred embodiment of the invention are stored in a cloud or another external, decentralized storage location.

Furthermore, the end faces of the pipe ends are inspected by means of a second sensor, wherein the second sensor uses a different inspection method than the first sensor. The end faces of the pipe ends are preferably first planed before the examination to obtain a clean and flat surface and the visual inspection is subsequently carried out. The ascertained inspection data are also evaluated or calculated by means of an algorithm here and classified or assessed as suitable or unsuitable for a weld on the basis of predetermined values. This is also carried out, as in the first inspection, by a comparison to stored values, wherein these are also preferably readapted and supplemented again and again. If the inspections previously carried out have each resulted as the result of the evaluations that the pipe ends are suitable for a weld, a weld can be carried out. It has been shown to be advantageous if the welding reflector used for heating the pipe ends is also optically inspected before its use, preferably by means of the second sensor. Contaminants can thus also be prevented from being introduced into the weld in this step. The welding process carried out is recorded by the system or the controller to ascertain whether the process was executed correctly and all boundary conditions were complied with. For this purpose, the welding times, welding temperatures, the welding pressure, and also the supplied welding energy are preferably monitored and recorded. Alternatively, still further data can also be monitored and recorded, for example, the ambient temperature, etc. These welding data are then also incorporated into the final evaluation of the weld.

After the welding, an evaluation of the weld is carried out again on the basis of the ascertained data by means of an algorithm. For the final evaluation of the weld, the preceding inspection data and the recorded data of the welding process carried out are evaluated with the aid of an algorithm and the weld seam is classified as good or unusable.

It is advantageous that the evaluation of the weld is carried out on the basis of an algorithm which takes into consideration the ascertained inspection data and the recorded welding process and uses them in the calculation. Wherein the algorithm also incorporates the ascertained inspection data at least from the first and second inspection, which originate from the ultrasonic inspection of the predetermined region and the optical inspection of the end face. Moreover, the algorithm includes the recorded data of the welding process or its incorporation, preferably data about the welding temperatures and welding times.

It is advantageous if the microstructure of the pipe is examined by means of the inspection of the predetermined region at the pipe ends by the first sensor.

The inspection of the predetermined region at the pipe ends, which is carried out by means of the first sensor, examines the microstructure of the pipe before the welding process. Since most inadequate welds originate because material flaws such as inclusions, defects, contaminants, etc. already exist in the pipe end in the region of the welding zone, faults can already be avoided by a microstructure inspection of the pipe wall before the welding in the predetermined region.

It is advantageous if the welding device has a controller and a memory for data processing, wherein an inspection device can also be adaptable to the welding device and the inspection device has a controller and a memory for data processing.

It has proven to be advantageous if the predetermined region of the pipe ends is inspected by means of sound waves, preferably ultrasound. It can thus be ascertained whether the microstructure has no inclusions or other impurities, which would weaken a weld seam or this would no longer correspond to the requirements.

The second sensor is preferably an optical sensor, by which an optical inspection of the end faces of the pipe ends is carried out. The end faces are inspected for soiling, damage, or other criteria which could damage the weld. The second sensor is preferably also arranged in the inspection head and is preferably also used for aligning or adjusting the inspection head with respect to the clamped pipe ends. The optical sensor is preferably designed as a light-sensitive sensor, especially preferably as a camera.

According to one preferred embodiment, the predefined region at the two pipe ends is arranged spaced apart from the end face and corresponds to the welding zone which is heated for the welding. Since in general the frontmost region of the pipe ends is planed off, because it usually has soiling and does not have a planar surface, the predetermined region which is to be inspected is arranged spaced apart or offset from the end face, since after the planing of the end face this region will press directly against the heating reflector and will become the welding zone.

The method according to the preferred embodiment of the invention is preferably also distinguished in that the clamped pipe ends are detected by the welding device or the inspection head to ascertain the pipe parameters, wherein the detection is carried out by scanning the pipe ends, scanning a barcode, or by manual input of the pipe data. It is advantageous if the optical sensor in the inspection head autonomously detects the pipe ends on the basis of their dimensions and colour or by way of a barcode which can be acquired. Wherein this can also be carried out by a further sensor that is connected to the controller.

A further preferred embodiment has been shown when the predetermined region at the pipe ends is also optically inspected, preferably by means of the second sensor. In addition to the microstructure inspection, preferably by means of ultrasound, it has been shown that it is advantageous to also optically inspect this region since some contaminants can also be present on the surface, which is then detected by the visual inspection and which can also have a negative influence on the weld.

A further advantageous embodiment has also been shown when after the welding process, the resulting weld seam is inspected even before the cooling and while the pipe ends are still clamped in the welding device, preferably by means of ultrasound and/or camera. On the one hand, this once again enables a further inspection and, on the other hand, a large time loss is not accepted here, since the inspection takes place directly after carrying out the weld in the welding device. Thus, no waiting time is required until the weld seam has cooled, rather the microstructure inspection of the weld seam can take place directly following the welding.

This aspect is also achieved according to the preferred embodiment of the invention in that a system according to the preferred embodiment of the invention for assessing a butt weld of plastic pipes or fittings includes a welding device for the end-face welding of plastic pipe ends or fitting ends, and an inspection device, wherein the inspection device has an inspection head and at least two sensors are arranged in the inspection head, a controller, and a memory, wherein the sensors have different inspection methods or are based on different inspection technologies.

The inspection device can be adapted later to an already existing welding device and can also be integrated directly in the welding device. This has advantages with respect to the controller and the memory, since then the system has a controller and a memory and in a retrofitted inspection device, it is entirely possible that the welding device and the inspection device have a controller and a memory and these are supposed to be synchronized or only one of the devices has a controller and a memory and the other may be connected thereto.

The inspection head preferably has an optical sensor and an acoustic sensor. This enables a first inspection in the predetermined region in order to inspect the microstructure, wherein the acoustic sensor is used for this purpose. The optical sensor subsequently checks the surface of the end faces of the pipes or fittings to be welded. Wherein the optical sensor can also be used for further inspections or also detections, as mentioned in the description of the method. Of course, still further sensors can also be integrated in the system to carry out further inspections or detections.

It has proven to be advantageous if the first sensor is an ultrasonic sensor and the second sensor is a light-sensitive sensor, preferably a camera. The microstructure and the possible contaminants are detected using the first sensor and evaluated with the aid of an algorithm. It is then selected on the basis of this first inspection whether the predetermined regions are suitable for a weld or not, as already explained above with respect to the method. The inspection data which were acquired using the light-sensitive sensor are also evaluated by means of an algorithm as to whether the inspected points are suitable for a weld or not. Due to this early inspection of the pipes and fittings, the pipe ends and fitting ends which do not meet the requirements can be detected before the welding and removed accordingly. This saves a large amount of time, since welds are hardly still carried out in which the base material does not already correspond to the requirements and would therefore be unusable. An inspection of the pipe ends and fitting ends before the welding significantly reduces the flawed welds, since most flawed welds result due to flawed starting material, these can already be avoided or eliminated before the welding.

In one preferred embodiment, the inspection device is integrated in the welding device. Therefore, as mentioned above, everything can be carried out using the same controller. Moreover, the inspection head can be arranged optimally in the welding device.

All embodiment options can be combined freely with one another and the features of the method are applicable to the system and vice versa.

DRAWING

Figure 2:
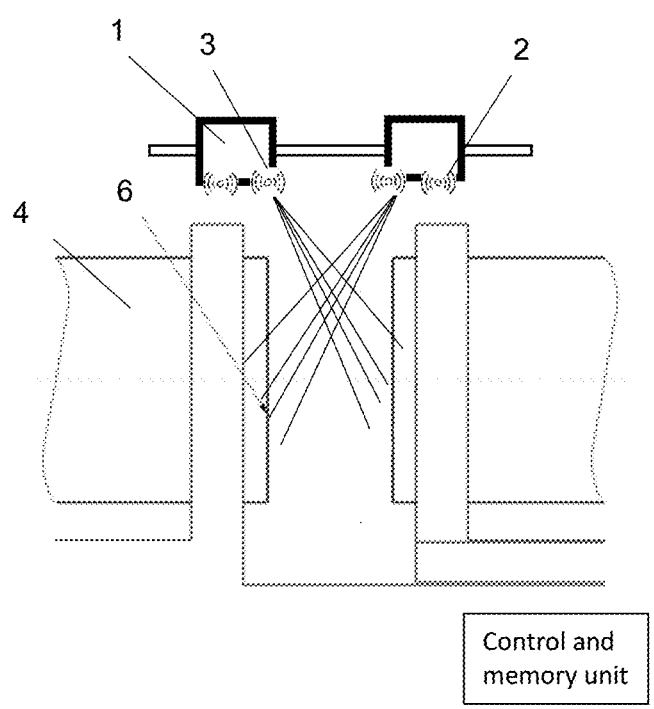

An exemplary embodiment of the invention will be described on the basis of the figures, wherein the invention is not only restricted to the exemplary embodiment. In the figure:

FIG. 1 shows a schematic sequence of the method according to the preferred embodiment of the invention with a schematic arrangement of the components of the system according to the preferred embodiment of the invention; and FIG. 2 is an enlarged view illustrating the welding process.

DESCRIPTION OF THE PREFERRED EMBODIMENTS OF THE INVENTION

The drawing shown in FIG. 1 shows the schematic sequence of the method according to the preferred embodiment of the invention and a schematic sketch of the components of the system according to the preferred embodiment of the invention. It is apparent in step A that the inspection head 1 inspects or scans the predetermined regions 5 in end portions of the pipes near the end faces 6. Before this step takes place, the pipe and/or fitting ends 4 to be welded were clamped in the welding device (not shown). The end faces of the pipe or fitting ends 6 were mutually aligned. The inspection head 1 orients itself thereupon on the basis of the clamped pipe ends 6 or approaches the desired position autonomously. This is achieved in that the controller of the device detects the clamped pipe ends 6 or the pipe parameters, wherein this can take place by acquiring a code, by manual input, or by detecting the pipes as such, on the basis of the dimensions, colour, etc. The inspection head 1 aligns itself autonomously on the basis of the values stored in the controller. The inspection or the scanning of the predetermined region 5 of by the first sensor 2 in the inspection head 1 thereupon takes place, which is preferably designed as an acoustic sensor, especially preferably as an ultrasonic sensor. Subsequently, the evaluation of the inspection data takes place with the aid of an algorithm, which enables it on the basis of the inspection data to classify the region as adequate or inadequate for a weld. If the region is classified as adequate, step B takes place. In this step, by means of a second sensor 3, which is preferably also arranged in the inspection head 1, the surface of the end faces 6 of the pipe ends is inspected. Of course, the end faces 6 were previously planed off down to the welding zone 5, which corresponds to the predetermined region. An optical sensor 3 is used for this purpose, preferably a light-sensitive sensor, especially preferably a camera. A subsequent evaluation of the inspection data also takes place here with the aid of an algorithm, which defines whether the end faces 6 meet the requirements for a weld 7. If so, the welding takes place(as additional shown in FIG. 2), if not, for example, the end face 6 can be reworked once again. In step C, the pipe ends 4 already brought together can be seen, wherein these were first heated using a welding reflector (not visible), of course, so that the material may be joined together when they are moved together. There is also the option of examining the welding reflector before the heating process once again by means of the optical sensor 3 or an additional optical sensor 3, so that it does not introduce contaminants into the weld once again.

In step D, the weld seam 7 after the weld can finally be seen, wherein this can also be examined once again by means of the acoustic 2 and/or optical 3 sensor. Of course, the welding process, i.e., the times, temperatures, etc. are also monitored and these welding data are also acquired in the controller. Ultimately, a final evaluation of the weld is carried out on the basis of the first and second inspection data and the recorded welding data, wherein these data are evaluated with the aid of an algorithm and these then result in the conclusion as to whether the weld is to be assessed as good or inadequate. All of these data can be stored in the welding device, the inspection device, thus the system, or in a remote storage location. Moreover, the data can be accessed and updated at any time using the controller and using a portable operating unit. This can take place autonomously or manually. Moreover, a data exchange can take place between further devices.

What is claimed is:

1. A method for assessing a butt weld of plastic pipes or fittings in a welding device, each pipe having an end portion with an end face, the method comprising:

clamping or fixing the end portions of the pipes to be welded in the welding device with end faces of each pipe opposing each, autonomously aligning or adjusting an inspection head on the basis of pipe parameters, inspecting a predetermined region at the two pipe end portions by a first sensor arranged in the inspection head, evaluating ascertained inspection data from the first sensor on the basis of predetermined values, inspecting the end faces of the pipes by a second sensor, wherein the second sensor uses a different inspection method than the first sensor, evaluating ascertained inspection data from the second sensor on the basis of predetermined values, carrying out a welding process on the pipes including recording information about the welding process, wherein a final evaluation of the weld is carried out on the basis of the ascertained inspection data from the first and second sensor and the recorded information about the welding process.

2. A method according to claim 1, wherein the final evaluation of the weld is carried out on the basis of an algorithm which takes into consideration the ascertained inspection data from the first and second sensors and the recorded information about the welding process.

3. A method according to claim 1, wherein the microstructure of the pipe is checked by means of the inspection of the predetermined region at the pipe end portions by means of the first sensor.

4. A method according to claim 1, wherein the predetermined region at the pipe end portions is inspected by means of sound waves.

5. A method according to claim 1, wherein the second sensor is an optical sensor and an optical inspection of the end faces of the pipes takes place by a light-sensitive sensor.

6. A method according to claim 1, wherein the predetermined region at the pipe end portions is spaced apart from the end face and corresponds to a region of the welding zone for the weld.

7. A method according to claim 1, wherein the clamped pipe end portions are detected by the welding device or the inspection head, wherein the detection is carried out by scanning the pipe end portions, scanning a barcode, or by manual input of the pipe parameters.

8. A method according to claim 1, wherein the predetermined region at the pipe end portions is optically inspected.

9. A method according to claim 1, wherein, after the welding process, a weld seam is inspected by ultrasound before cooling.

10. A system for assessing a butt weld of plastic pipes or fittings, according to the method according to claim 1, including a welding device for the welding of plastic pipe ends or fitting ends, an inspection device, wherein the inspection device has an inspection head and two sensors are arranged in the inspection head, a controller, and a memory, wherein the two sensors have different inspection methods.

11. A system according to claim 10, wherein the inspection head has an optical sensor and an acoustic sensor.

12. A system according to claim 10, wherein a first sensor is an ultrasonic sensor and a second sensor is a light-sensitive sensor.

13. A system according to claim 10, wherein the inspection device is integrated in the welding device.

* * * * *